US012482445B2

(12) United States Patent
Lee et al.

(10) Patent No.: US 12,482,445 B2
(45) **Date of Patent: *Nov. 25, 2025**

(54) LIQUID OXYGEN VENT SILENCER

(71) Applicant: LET ENGINEERING CO., LTD., Hwaseong-si (KR)

(72) Inventors: Ju Sik Lee, Ansan-si (KR); Hyung Dong Lee, Suwon-si (KR); Sun Byeul Jo, Gyeongsan-si (KR); Won Myeong Seo, Incheon (KR); Tae Kyu Kim, Anyang-si (KR); Dong Guen Lee, Ansan-si (KR)

(73) Assignee: LET ENGINEERING CO., LTD., Hwaseong-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/060,265

(22) Filed: Feb. 21, 2025

(65) Prior Publication Data

US 2025/0191563 A1 Jun. 12, 2025

Related U.S. Application Data

(63) Continuation-in-part of application No. PCT/KR2023/013275, filed on Sep. 5, 2023.

(30) Foreign Application Priority Data

Sep. 6, 2022 (KR) ........................ 10-2022-0113034

(51) Int. Cl.
*G10K 11/16* (2006.01)
*F17C 13/12* (2006.01)

(52) U.S. Cl.
CPC ............ *G10K 11/161* (2013.01); *F17C 13/12* (2013.01)

(58) Field of Classification Search
CPC ........... F17C 7/02; F17C 13/12; F16L 55/033; G10K 11/161
See application file for complete search history.

(56) References Cited

U.S. PATENT DOCUMENTS 3,648,472 A * 3/1972 Kozlowski ............. F17C 13/12
62/50.5

FOREIGN PATENT DOCUMENTS

CN 201778861 U 3/2011
CN 201983651 U * 9/2011
(Continued)

OTHER PUBLICATIONS

English translation of CN-107917336-A, accessed from PE2E Search. (Year: 2018).*

(Continued)

*Primary Examiner* — Jeremy A Luks
(74) *Attorney, Agent, or Firm* — Studebaker Brackett PLLC

(57) ABSTRACT

The present disclosure relates to a liquid oxygen vent silencer implemented so as to eliminate potentially explosive elements, and the liquid oxygen vent silencer is manufactured using copper plates and stainless (SUS) having no risk of explosions to minimize an edge that collide with oxygen gas, and includes a silencer body that receives cryogenic liquid gas and moves an internal space up and down to reduce noise; and a raising/lowering support portion that is installed along an outside of the silencer body and supports the silencer body by raising or lowering the silencer body from a ground.

7 Claims, 7 Drawing Sheets

(56) References Cited

FOREIGN PATENT DOCUMENTS

| | | | | | |
|---|---|---|---|---|---|
| CN | 107917336 | A | * | 4/2018 | |
| CN | 207316463 | U | * | 5/2018 | |
| CN | 207727033 | U | * | 8/2018 | |
| CN | 210303057 | U | | 4/2020 | |
| CN | 214579659 | U | | 11/2021 | |
| CN | 214889686 | U | * | 11/2021 | ............ A01M 29/32 |
| JP | 2005-335684 | A | | 12/2005 | |
| KR | 10-0139594 | B1 | | 7/1998 | |
| KR | 20-0292942 | Y1 | | 10/2002 | |
| KR | 10-2006-0031575 | A | | 4/2006 | |
| KR | 10-0738480 | B1 | | 7/2007 | |
| KR | 10-0962523 | B1 | | 6/2010 | |
| KR | 10-2481825 | B1 | | 12/2022 | |

OTHER PUBLICATIONS

International Search Report issued in PCT/KR2023/013275; mailed Jan. 9, 2024.

* cited by examiner

LIQUID OXYGEN VENT SILENCER

CROSS-REFERENCE SECTION

The present application is a continuation-in-part of International Patent Application No. PCT/KR2023/013275, filed on Sep. 5, 2023, which is based upon and claims the benefit of priority to Korean Patent Application No. 10-2022-0113034 filed on Sep. 6, 2022. The disclosures of the above-listed applications are hereby incorporated by reference herein in their entirety.

TECHNICAL FIELD

The present disclosure relates to a liquid oxygen vent silencer, and more specifically, to a liquid oxygen vent silencer implemented so as to minimize edges colliding with oxygen gas and eliminate potentially explosive elements.

BACKGROUND ART

Generally, a gas diffusing tower is installed in a gas base station. This gas diffusing tower is installed and used for the purpose of preventing safety accidents by discharging the gas remaining in a gas pipe to the atmosphere when maintenance is required due to an abnormality such as a gas leak in the gas pipe installed in the gas base station, causing the pressure inside the diffusing tower to exceed a set value.

This type of gas diffusing tower may be installed vertically at a height of about 20 to 30 m at a predetermined location on a gas pipe connection line of the gas base station, a scaffolding may be installed at a predetermined location on an outer side of a central portion and an outer side of an upper end portion of the diffusing tower so that a worker can climb up and perform the intended work, and a ladder may be installed from the ground to the scaffolding on the outer side of the upper end portion so that the worker can climb up to the scaffolding.

In addition, a lid is installed on the upper portion of the diffusing tower so that the lid can be opened and closed.

As mentioned above, when gas leaks from the gas pipe and the gas pressure inside the diffusing tower rises above the set value, the lid of the gas diffusing tower is opened so that the gas inside the gas diffusing tower is discharged into the atmosphere, thereby preventing safety accidents such as gas explosions from occurring, and the gas pipe installed on the lower portion of the inside of the gas diffusing tower can be inspected or the remaining gas in the gas pipe can be discharged for maintenance.

However, in the related art, there is a problem that when gas leaked from the gas pipe through the gas diffusing tower and the gas pressure inside the diffusing tower increases above the set value, or when gas is discharged through the diffusing tower to perform maintenance and inspection of the gas pipe, high acoustic energy and strong pulse-type pressure waves (impulsive noise with a duration) are generated due to the speed and pressure of the gas discharged at high pressure and high speed.

Therefore, in order to solve the above problem, even in the related art, a silencer having built-in sound-absorbing material is installed at the upper end portion of the diffusing tower to reduce noise when gas is discharged.

However, even in this case, when low-pressure discharge gas with a flow rate of at least 30 m/sec or less flows into the silencer through the diffusing tower, the sound-absorbing material built into the silencer is damaged by the high-temperature and high-pressure discharge gas and scattered, and thus, proper sound absorption cannot be achieved. In addition, there is a problem that the lifespan of the silencer is shortened and frequent maintenance is required.

Meanwhile, the aforementioned background technology is technical information that the present inventor possesses for deriving the present disclosure or acquires in the process of deriving the present disclosure, and cannot necessarily be said to be a publicly known technology disclosed to the general public before the application of the present disclosure.

DISCLOSURE

Technical Problem

One aspect of the present disclosure is to provide a liquid oxygen vent silencer that is manufactured using copper plates and stainless (SUS) having no risk of explosions to minimize edges that collide with oxygen gas and implemented so as to eliminate potentially explosive elements.

The technical problem of the present disclosure is not limited to the technical problem mentioned above, and other technical problems that are not mentioned can be clearly understood by those skilled in the art from the description below.

Technical Solution

According to one embodiment of the present disclosure, a liquid oxygen vent silencer includes: a silencer body that receives low-temperature liquid gas and moves an internal space up and down to reduce noise; and a raising/lowering support portion that is installed along an outside of the silencer body and supports the silencer body by raising or lowering the silencer body from a ground.

In one embodiment, the silencer body may include a first pipe that is formed in a cylindrical shape forming a sealed internal space, a second pipe that is formed in a cylindrical shape having a diameter smaller than that of the first pipe and installed along an inner side of the first pipe, has a lower end exposed to a lower side of the first pipe to receive the cryogenic liquid gas and deliver the cryogenic liquid gas to the internal space of the first pipe, and a third pipe that is formed in a cylindrical shape having a diameter smaller than that of the first pipe and a diameter larger than that of the second pipe and installed in a space between the first pipe and the second pipe, receives the cryogenic liquid gas which is raised along the internal space of the second pipe and discharged into the internal space through an upper side of the second pipe, lowers the cryogenic liquid gas along a space between an outer peripheral surface and an inner peripheral surface of the second pipe, raises the lowered cryogenic liquid gas again through a space between an inner peripheral surface and an outer peripheral surface of the first pipe, and then discharges the cryogenic liquid gas to an outside through an upper side of the first pipe.

In one embodiment, the liquid oxygen vent silencer according to the one embodiment may further include a copper soundproofing material installed along a space between the outer peripheral surface of the second pipe and an inner peripheral surface of the third pipe.

In one embodiment, a flange may be installed in a lower end of the second pipe exposed to a lower side of the first pipe, an upper end of the second pipe may be sealed by a pipe cap, and a first perforation portion having perforation holes repeatedly formed may be formed at an upper portion of the second pipe to discharge the cryogenic liquid gas raised along the internal space from the flange.

In one embodiment, a lower end of the third pipe may be disposed spaced upward from a bottom surface of the internal space of the first pipe, a second perforation portion having perforation holes repeatedly formed along a lower portion of the third pipe may be formed to discharge the cryogenic liquid gas lowered along the space between the outer peripheral surface and the inner peripheral surface of the second pipe, the third pipe may include a third perforation portion having perforation holes repeatedly formed along an upper portion of the third pipe installed along an edge of an opening portion formed at the upper end of the first pipe to discharge the cryogenic liquid gas raised again through the space between the inner peripheral surface and the outer peripheral surface of the first pipe to the outside through the upper side of the first pipe, and a lower end of the third perforation portion may be seal-formed to prevent the cryogenic liquid gas discharged to the upper side of the first pipe from flowing into the internal space.

In one embodiment, the liquid oxygen vent silencer according to the one embodiment may further include a purge cap installed in the lower end of the first pipe.

In one embodiment, the liquid oxygen vent silencer according to the one embodiment may further include a buffer-type auxiliary support portion that is installed along an outer side of the first pipe to support the first pipe and absorb vibration or shock transferred from the first pipe during the noise reduction process.

In one embodiment, the buffer-type auxiliary support portion may include a ring-shaped frame that is formed in a circular ring shape having a diameter larger than that of the first pipe and disposed to cover the outer side of the first pipe, a plurality of supports that is installed at regular intervals along an outer side of the ring-shaped frame to support the ring-shaped frame, a plurality of movable buffer units that are installed at regular intervals along an inner peripheral surface of the ring-shaped frame and disposed along the outer peripheral surface of the first pipe, support the outer peripheral surface of the first pipe while moving along the inner peripheral surface of the ring-shaped frame, absorb vibration or shock transferred from the first pipe, and a movable buffer unit that rotatably drives the movable buffer unit.

The movable buffer unit may include a rotating ring that is formed in a circular ring shape corresponding to a shape of a sliding groove formed along the inner peripheral surface of the ring-shaped frame, installed along the inner side of the sliding groove and configured so that the plurality of movable buffer units are installed at regular intervals along the inner peripheral surface, and a ring rotation gear that is connected and interlocked with a gear tooth formed along an outer peripheral surface of the rotating ring and rotates in a forward or reverse direction to rotatably drive the rotating ring.

The rotation driving unit may include a rotational block that is installed on the inner peripheral surface of the rotating ring, a first support wheel that is installed so as to be rotatably connected to one side of a front end of the rotational block and exposed from the sliding groove and closely seated on the outer peripheral surface of the first pipe, and moves while rotating along the outer peripheral surface of the first pipe as the rotational block moves, and a second support wheel that is installed so as to be rotatably connected to the other side of the front end of the rotational block and exposed from the sliding groove and closely seated on the outer peripheral surface of the first pipe, and moves while rotating along the outer peripheral surface of the first pipe as the rotational block moves.

The rotational block may include a first block that is installed on the inner peripheral surface of the rotating ring, a block seating groove that is formed at a front end of the first block, a second block which is seated on the block seating groove and has a front end exposed from the block seating groove and in which the first support wheel and the second support wheel are installed so as to be rotatably connected to one side and the other side of the front end, and a plurality of block support springs that are spaced apart from each other along the inner side of the block seating groove to support the second block installed in the block seating groove and absorb vibration or shock transferred from the second block.

The liquid oxygen vent silencer may further include a control unit that controls an operation of the silencer body, in which the control unit may include an environmental detection sensor unit that measures a gas flow rate, pressure, temperature, and exhaust component inside the silencer body, an ultrasonic echo sensor unit that measures acoustic characteristics generated from the exhaust port of the silencer in real time, a variable exhaust port control unit that forms or alleviates turbulence by controlling a pressure and flow rate of an exhaust gas, a resonance damping flow control unit that controls a flow path inside the exhaust port to suppress a resonance phenomenon generated at the exhaust port, a low-temperature liquid injection unit that induces noise reduction by controlling the temperature of the exhaust gas, and a pattern analysis and learning module that analyzes a data pattern based on machine learning and automatically applies an optimal noise reduction algorithm, when the control unit receives the gas flow rate, pressure, temperature, and exhaust component data measured by the environmental detection sensor unit, the control unit may identify them and calculate a real-time change rate for each of them, and when it is identified that noise at the silencer exhaust port exceeds a preset first reference value, the control unit may activate the variable exhaust port control unit to adjust an exhaust flow rate, adjust an exhaust port opening degree so that a mixing method of the exhaust gas and an outside air changes, and use the ultrasonic echo sensor unit to analyze whether acoustic resonance occurs in the exhaust port, operate the resonance damping flow control unit to change the flow path inside the exhaust port and adjust an air distribution structure so that noise is not concentrated in a specific frequency band when the resonance phenomenon is detected at a preset first frequency, operate the low-temperature liquid injection unit to inject low-temperature liquid inside the exhaust port and mix the low-temperature liquid with the exhaust gas to change the density and induce a noise reduction effect when the temperature of the exhausted gas exceeds a preset first temperature, continuously analyze data collected throughout all the processes through a machine learning-based pattern analysis and learning module, train past data to improve noise reduction performance according to changes in environmental conditions, and automatically apply an optimal noise reduction algorithm when a similar environment occurs.

The control unit may control the operation of the silencer body based on mathematical modeling, predict noise intensity that occurs in the exhaust port using the gas flow rate, pressure, temperature, and exhaust component data collected from the environmental detection sensor unit, identify a change in the noise intensity by reflecting structural characteristics of the silencer and gas flow characteristics, adjust the exhaust port opening degree in real time to control the pressure and flow rate of the exhaust gas and analyze a degree to which the gas forms turbulence in the exhaust port to determine a flow state capable of reducing noise when it is determined that the noise intensity in the exhaust port exceeds a certain level, evaluate whether resonance occurs at a specific frequency around the exhaust port based on the data measured by the ultrasonic echo sensor unit, and change the flow path inside the exhaust port to prevent noise concentration in a specific frequency band when resonance is detected, calculate an appropriate amount of cooling for noise reduction by considering thermal characteristics and exhaust speed of the exhaust gas when the temperature of the exhaust gas exceeds a certain level, and supply cooling fluid into the exhaust port by operating the low-temperature liquid injection unit to change the gas density and induce noise reduction effect, and analyze the data collected in the mathematical modeling process in real time using the machine learning-based pattern analysis and learning module, and automatically adjust the exhaust port opening degree, the flow path, or a cooling method to optimize noise reduction performance according to an environmental change by training past data.

Advantageous Effects

According to one aspect of the present disclosure described above, since the liquid oxygen vent silencer is manufactured using copper plates and stainless (SUS) having no risk of explosions to minimize edges that collide with oxygen gas, it is possible to eliminate potentially explosive elements.

The effect of the present disclosure is not limited to the effects mentioned above, and various effects can be included within a range that is obvious to a person skilled in the art from the contents described below.

DESCRIPTION OF REFERENCE NUMERALS

Figure 1:
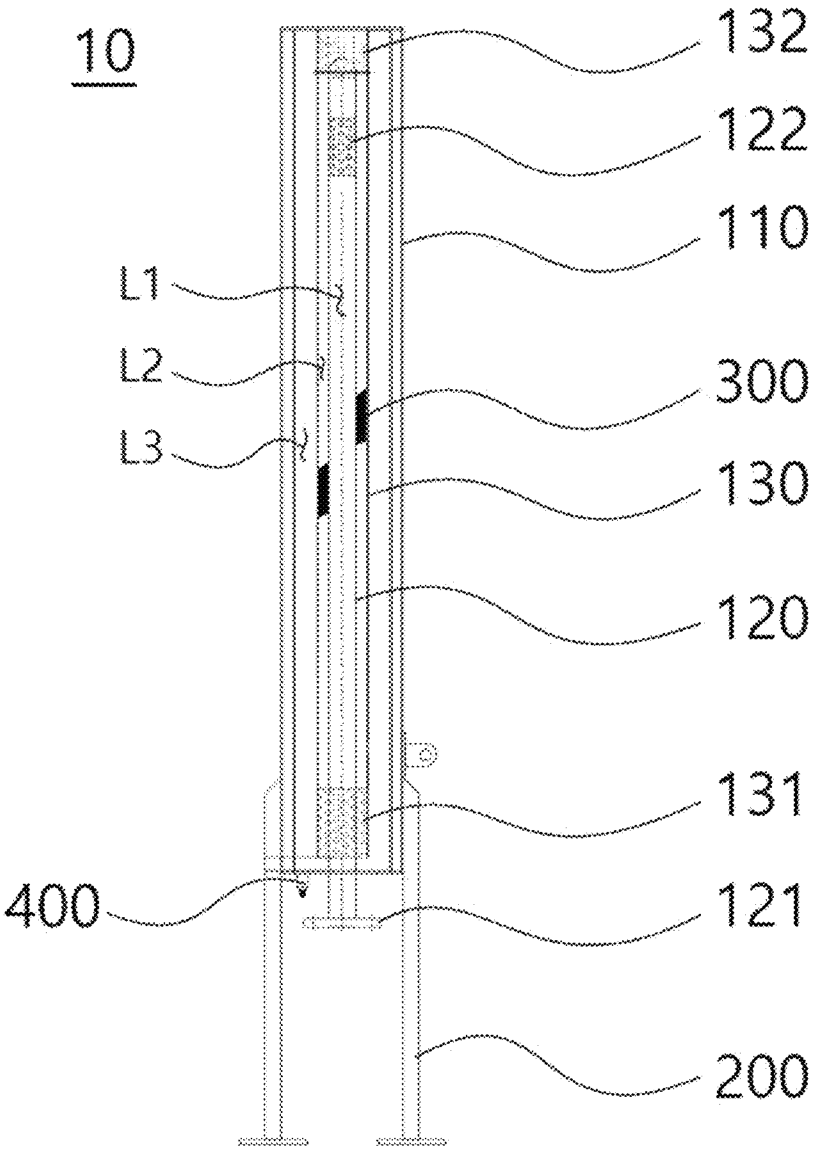
FIG. 1 is a view illustrating a schematic configuration of a liquid oxygen vent silencer according to one embodiment of the present disclosure.
Figure 2:
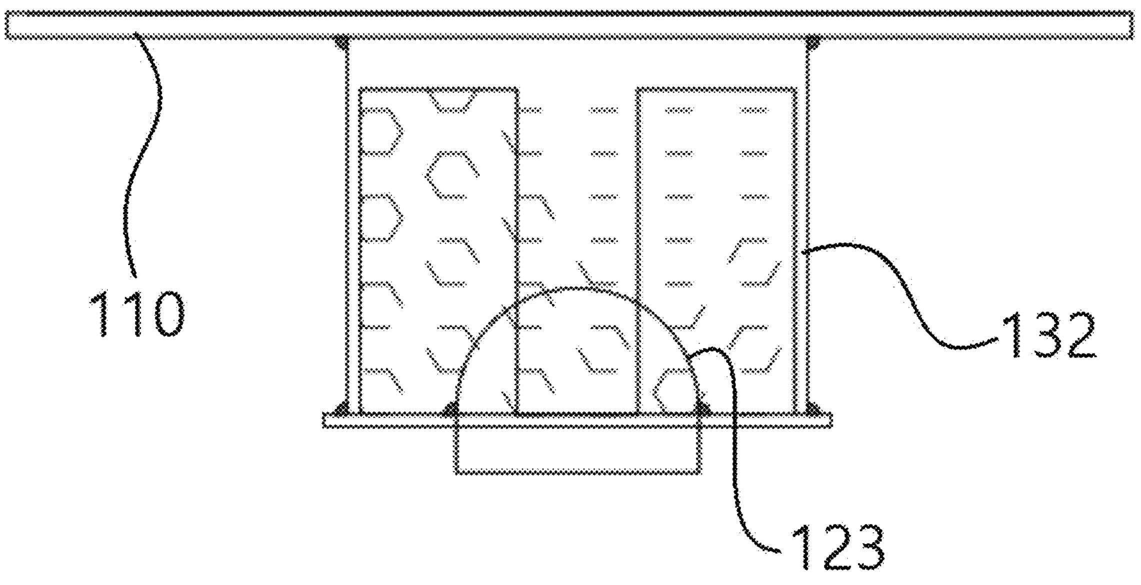
FIG. 2 is a view illustrating an upper end of a second pipe of FIG. 1.

The detailed description of the present disclosure described below refers to the accompanying drawings, which illustrate specific embodiments in which the present disclosure may be implemented. These embodiments are described in sufficient detail to enable those skilled in the art to practice the present disclosure. It should be understood that the various embodiments of the present disclosure are different from each other, but are not necessarily mutually exclusive. For example, specific shapes, structures, and characteristics described herein may be implemented in other embodiments without departing from the spirit and scope of the present disclosure with respect to one embodiment. It should also be understood that the location or arrangement of individual components within each disclosed embodiment may be changed without departing from the spirit and scope of the present disclosure. Accordingly, the detailed description set forth below is not intended to be limiting, and the scope of the present disclosure is limited only by the appended claims, along with the full scope equivalent to what the claims assert, if properly described. Similar reference numerals in the drawings designate the same or similar functions throughout.

Hereinafter, preferred embodiments of the present disclosure will be described in more detail with reference to the drawings.

FIG. 1 is a view illustrating a schematic configuration of a liquid oxygen vent silencer according to one embodiment of the present disclosure.

Referring to FIG. 1, a liquid oxygen vent silencer 10 according to one embodiment of the present disclosure includes a silencer body 100 and a raising/lowering support portion 200.

The silencer body 100 reduces noise by receiving cryogenic liquid gas and moving an internal space up and down.

In one embodiment, the silencer body 100 may include a first pipe 110, a second pipe 120, and a third pipe 130.

The first pipe 110 is formed in a cylindrical shape forming a sealed internal space L1.

The second pipe 120 is formed in a cylindrical shape having a diameter smaller than that of the first pipe 110 and is installed along the inner side of the first pipe 110, and a lower end of the second pipe is exposed to the lower side of the first pipe 110 to receive the cryogenic liquid gas and deliver the cryogenic liquid gas to the internal space of the first pipe 110.

In one embodiment, the second pipe 120 may have a flange 121 installed at the lower end exposed to the lower side of the first pipe 110, an upper end of the second pipe may be sealed by a pipe cap, and a first perforation portion 122 having perforation holes repeatedly formed may be formed at the upper portion of the second pipe to discharge the cryogenic liquid gas rising along the internal space from the flange 121.

In one embodiment, the upper end of the second pipe 120 may be sealed by an upper cap 123.

The third pipe 130 is formed in a cylindrical shape that has a diameter smaller than that of the first pipe 110 and larger than that of the second pipe 120 and installed in a space between the first pipe 110 and the second pipe 120. Moreover, the third pipe receives the cryogenic liquid gas that is raised along the internal space L1 of the second pipe 120 and discharged into the internal space through the upper side of the second pipe 120, lowers the cryogenic liquid gas along a space L2 between the outer peripheral surface and the inner peripheral surface of the second pipe 120, raises the lowered cryogenic liquid gas again through a space L3 between the inner peripheral surface and the outer peripheral surface of the first pipe 110, and then discharges the raised cryogenic liquid gas to the outside through the upper side of the first pipe 110.

In one embodiment, the lower end of the third pipe 130 may be disposed spaced upward from a bottom surface of the internal space of the first pipe 110, a second perforation portion 131 having perforation holes repeatedly formed along a lower portion of the third pipe may be formed to discharge the cryogenic liquid gas lowered along the space between the outer peripheral surface and the inner peripheral surface of the second pipe 120, the third pipe may include a third perforation portion 132 having perforation holes repeatedly formed along an upper portion of the third pipe installed along an edge of an opening portion formed at the upper end of the first pipe 110 to discharge the cryogenic liquid gas raised again through the space between the inner peripheral surface and the outer peripheral surface of the first pipe 110 to the outside through the upper side of the first pipe 110, and the lower end of the third perforation portion may be seal-formed to prevent the cryogenic liquid gas discharged to the upper side of the first pipe 110 from flowing into the internal space.

In one embodiment, the first pipe 110, the second pipe 120, and the third pipe 130 may be manufactured with stainless steel (SUS, a safe material for preventing explosion accidents due to oxygen gas, a durable copper material, and a stainless-steel material that maintains sufficient thickness and strength) to minimize edges that collide with oxygen gas and eliminate potentially explosive elements, so that noise can be implemented to be 50 db or less.

The liquid oxygen vent silencer 10 according to one embodiment of the present disclosure having the configuration described above may further include a soundproofing material 300.

The soundproofing material 300 is manufactured with a copper material installed along the space between the outer peripheral surface of the second pipe 120 and the inner peripheral surface of the third pipe 130.

The liquid oxygen vent silencer 10 according to one embodiment of the present disclosure having the configuration described above may further include a purge cap 400.

The fuzzy cap 400 is installed at the lower end of the first pipe 110.

The raising/lowering support portion 200 is installed along the outer side of the silencer body 100 to support the silencer body 100 by raising or lowering the silencer body from the ground.

The liquid oxygen vent silencer 10 according to one embodiment of the present disclosure having the configuration described above can implement the cryogenic vent silencer that enables safe and comfortable discharge by eliminating the risk of noise and gas generated when the cryogenic liquid gas expands 600-700 times into the atmosphere during venting.

Figure 3:
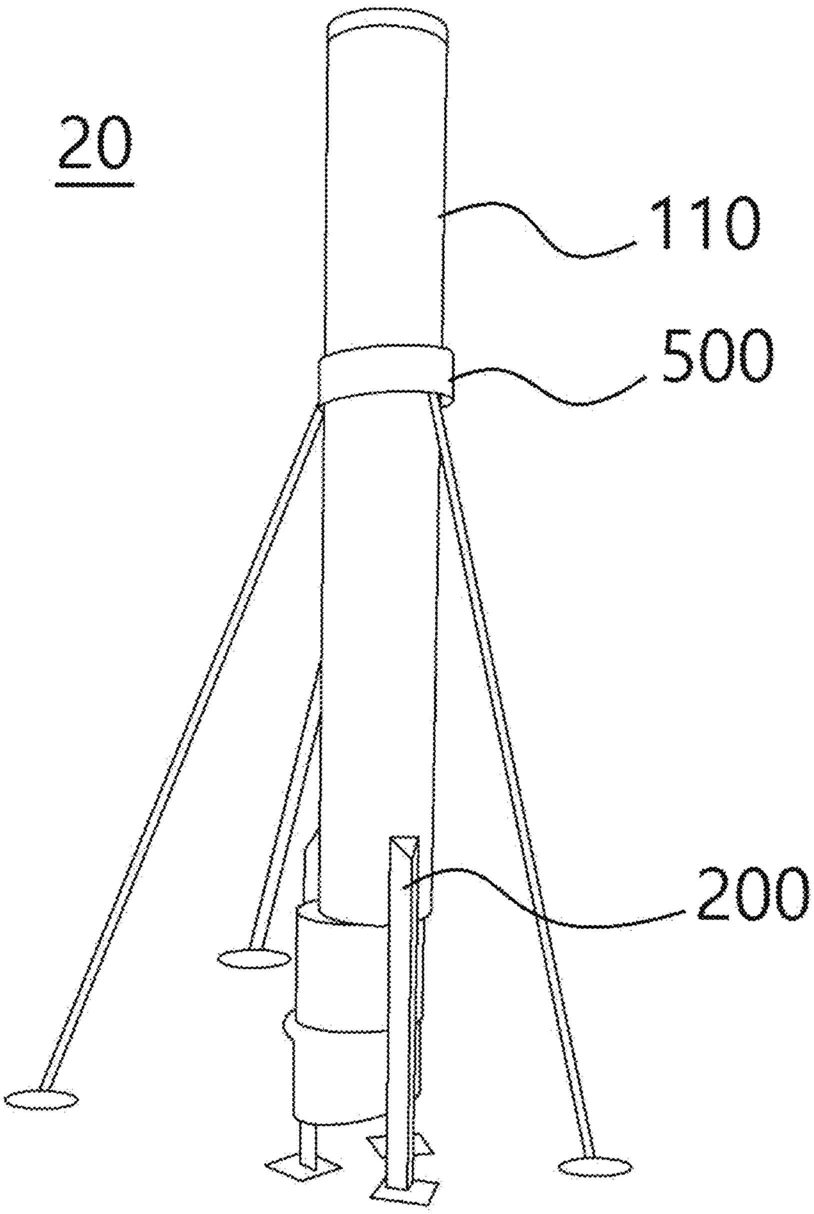
FIG. 3 is a view illustrating a schematic configuration of a liquid oxygen vent silencer according to another embodiment of the present disclosure.

FIG. 3 is a view illustrating a schematic configuration of a liquid oxygen vent silencer according to another embodiment of the present disclosure.

Referring to FIG. 3, a liquid oxygen vent silencer 20 according to another embodiment of the present disclosure includes a silencer body 100, a raising/lowering support portion 200, and a buffer-type auxiliary support portion 500.

Here, the silencer body 100 and the raising/lowering support portion 200 are the same as the components of FIG. 1, so descriptions thereof will be omitted.

The buffer-type auxiliary support portion 500 is installed along the outer side of the first pipe 110 to support the first pipe 110 and to absorb vibration or shock transferred from the first pipe 110 during a noise reduction process.

The liquid oxygen vent silencer 20 according to another embodiment of the present disclosure having the configuration described above can improve the noise reduction effect by absorbing vibration or shock caused by noise that may occur during the expansion process of the cryogenic liquid gas.

Figure 4:
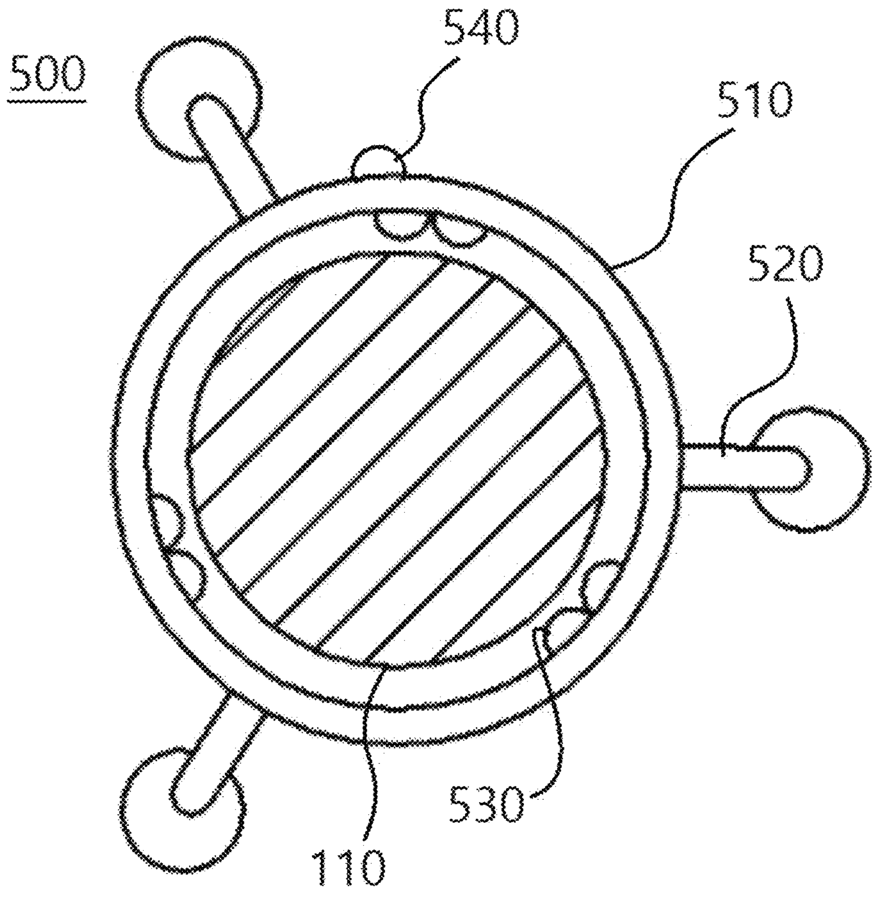
FIG. 4 is a view illustrating a buffer-type auxiliary support portion of FIG. 3.

FIG. 4 is a view illustrating the buffer-type auxiliary support portion of FIG. 3.

Referring to FIG. 4, the buffer-type auxiliary support portion 500 includes a ring-shaped frame 510, a plurality of supports 520, a movable buffer unit 530, and a movable buffer unit 540.

The ring-shaped frame 510 is formed in a circular ring shape having a diameter larger than the diameter of the first pipe 110 and is disposed to cover the outer side of the first pipe 110.

The plurality of supports 520 are installed at regular intervals along the outer side of the ring-shaped frame 510 to support the ring-shaped frame 510.

The movable buffer unit 530 is installed in multiple units (preferably at least 3 units) spaced apart at regular intervals along the inner peripheral surface of the ring-shaped frame 510 and disposed along the outer peripheral surface of the first pipe 110. Moreover, the movable buffer unit supports the outer peripheral surface of the first pipe 110 while moving along the inner peripheral surface of the ring-shaped frame 510 and absorbs the vibration or shock transferred from the first pipe 110.

The movable buffer unit 540 drives the movable buffer unit 530 to rotate.

The buffer-type auxiliary support portion 500 having the configuration described above not only supports the first pipe 110 so that the first pipe can be stably erected, but also effectively absorbs the vibrations or shocks generated from the first pipe 110 by using the plurality of movable buffer units 530 that move in close contact along the outer peripheral surface of the first pipe 110.

Figure 5:
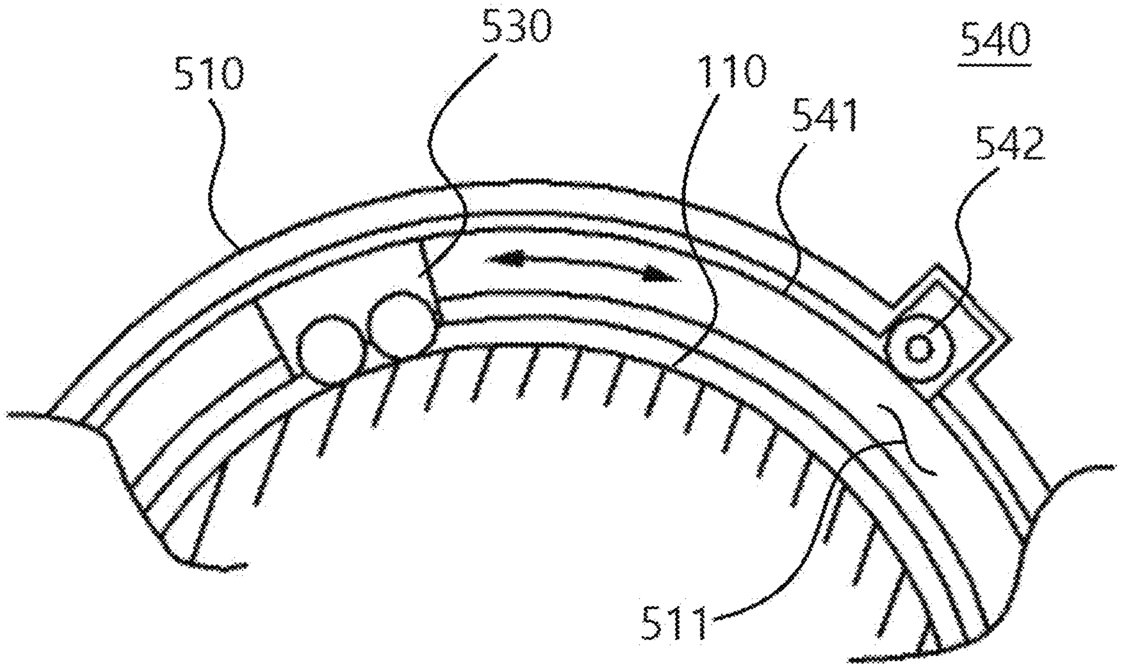
FIG. 5 is a view illustrating a movable buffer unit of FIG. 4.

FIG. 5 is a view illustrating the movable buffer unit of FIG. 4.

Referring to FIG. 5, the movable buffer unit 540 includes a rotating ring 541 and a ring rotation gear 542.

The rotating ring 541 is formed in a circular ring shape corresponding to the shape of a sliding groove 511 formed along the inner peripheral surface of the ring-shaped frame 510, and is installed along the inner side of the sliding groove, and a plurality of movable buffer units 540 are installed at regular intervals along the inner peripheral surface of the rotating ring.

The ring rotation gear 542 is connected and interlocked with a gear tooth (not illustrated in the drawing for convenience of explanation) formed along the outer peripheral surface of the rotating ring 541, and is rotated in the forward or reverse direction by a driving device such as a step motor (not illustrated in the drawing for convenience of explanation) to rotatably drive the rotating ring 541.

Figure 6:
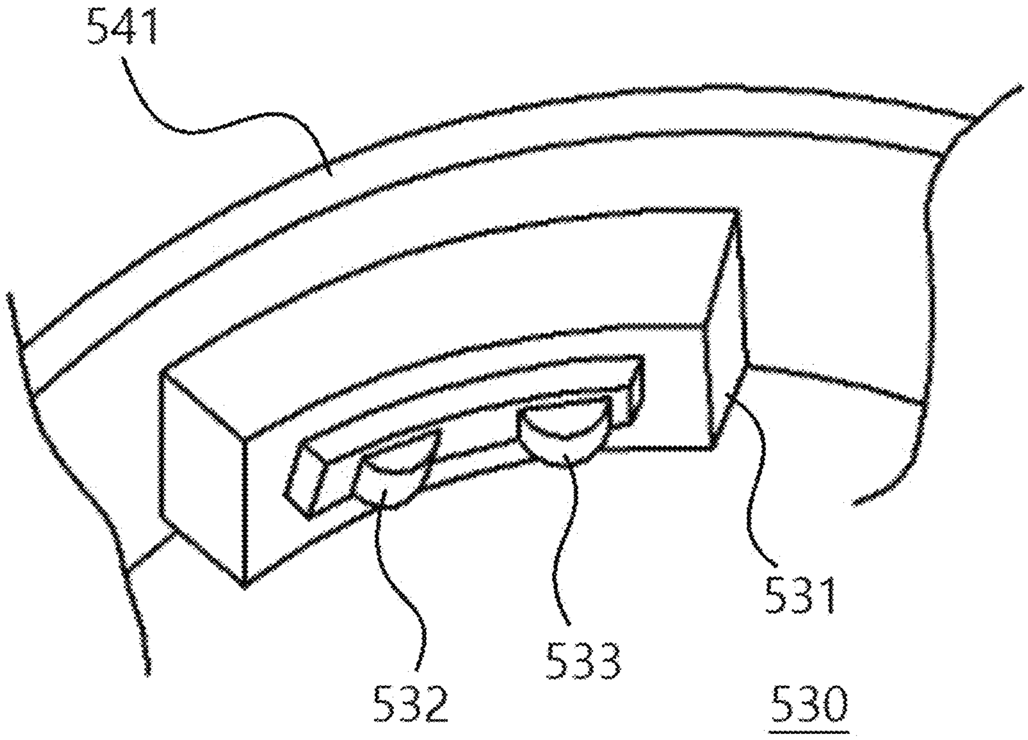
FIG. 6 is a view illustrating the movable buffer unit of FIG. 5.

FIG. 6 is a view illustrating the movable buffer unit of FIG. 5.

Referring to FIG. 6, the movable buffer unit 530 includes a rotational block 531, a first support wheel 532, and a second support wheel 533.

The rotational block 531 is installed on the inner peripheral surface of the rotating ring 541 and slides along the sliding groove 511, and the first support wheel 532 and the second support wheel 533 are installed so as to be rotatably connected to the front end of the rotational block.

The first support wheel 532 is installed so as to be rotatably connected to one side of the front end of the rotational block 531, is exposed from the sliding groove 511 and is closely seated on the outer peripheral surface of the first pipe 110, moves while rotating along the outer peripheral surface of the first pipe 110 as the rotational block 531 moves, and transfers vibration or shock transferred from the first pipe 110 to the rotational block 531.

The second support wheel 533 is installed so as to be rotatably connected to the other side of the front end of the rotational block 531, is exposed from the sliding groove 511 and is closely seated on the outer peripheral surface of the first pipe 110, moves while rotating along the outer peripheral surface of the first pipe 110 as the rotational block 531 moves, and transfers vibration or shock transferred from the first pipe 110 to the rotational block 531.

Figure 7:
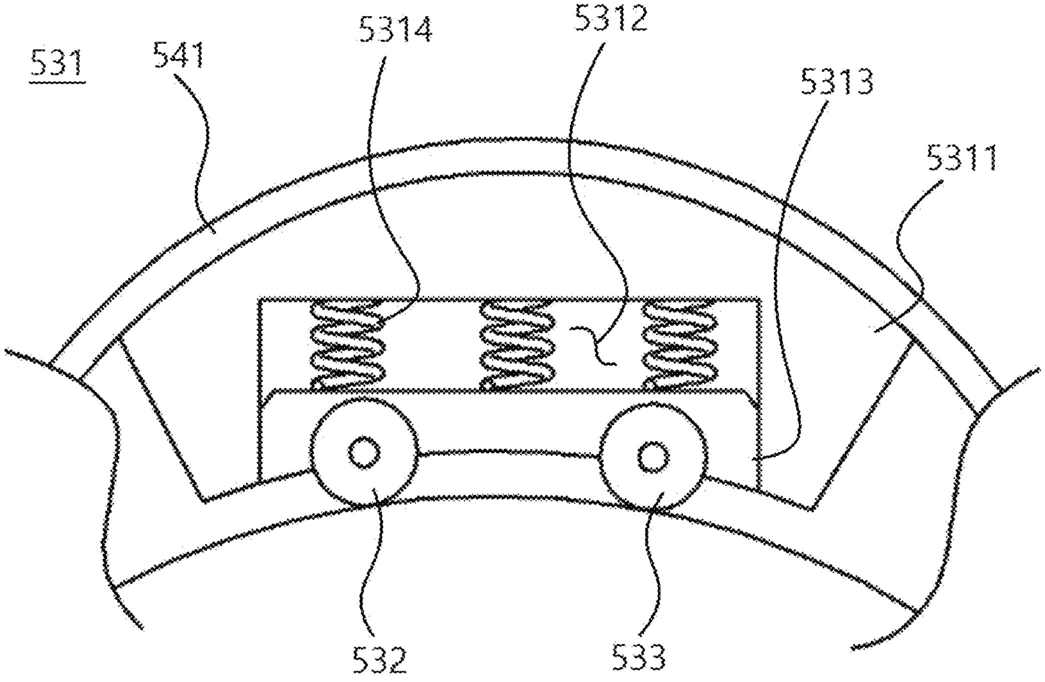
FIG. 7 is a view illustrating a rotational block of FIG. 6.

FIG. 7 is a view illustrating the rotational block of FIG. 6.

Referring to FIG. 7, the rotational block 531 includes a first block 5311, a block seating groove 5312, a second block 5313, and a plurality of block support springs 5314.

The first block 5311 is installed on the inner peripheral surface of the rotating ring 541, and components such as the block seating groove 5312, the second block 5313, and the plurality of block support springs 5314 are installed in the first block.

The block seating groove 5312 is formed at the front end of the first block 5311, and a second block 5313 is installed in the block seating groove.

The second block 5313 is seated on the block seating groove 5312, the front end of the second block is exposed from the block seating groove 5312, and the first support wheel 532 and the second support wheel 533 are installed so as to be rotatably connected to one side and the other side of the front end of the second block.

The plurality of block support springs 5314 are installed spaced apart from each other along the inner side of the block seating groove 5312 to support the second block 5313 installed in the block seating groove 5312, and absorb the vibration or shock transferred from the second block 5313.

The rotational block 531 having the configuration described above can effectively absorb the vibration or shock transferred from the first support wheel 532 and the second support wheel 533.

The liquid oxygen vent according to one embodiment of the present invention includes a control unit that controls an operation of the silencer body, and the control unit includes an environmental detection sensor unit that measures a gas flow rate, pressure, temperature, and exhaust component inside the silencer body, an ultrasonic echo sensor unit that measures acoustic characteristics generated from the exhaust port of the silencer in real time, a variable exhaust port control unit that forms or alleviates turbulence by controlling a pressure and flow rate of an exhaust gas, a resonance damping flow control unit that controls a flow path inside the exhaust port to suppress a resonance phenomenon generated at the exhaust port, a low-temperature liquid injection unit that induces noise reduction by controlling the temperature of the exhaust gas, and a pattern analysis and learning module that analyzes data patterns based on machine learning and automatically applies an optimal noise reduction algorithm.

The environmental detection sensor unit is installed to monitor the gas flow inside the silencer body in real time, and is configured to measure the flow rate, pressure, temperature, and exhaust components. The sensor unit acquires data at specific time intervals and analyzes the flow state of the exhaust gas to evaluate a silencer operating environment. When the pressure and temperature change rate of the gas exceed a certain threshold, the control unit determines whether the environment affects noise increase and generates a control signal to perform follow-up measures if necessary.

The ultrasonic echo sensor unit is disposed to measure the acoustic characteristics generated in the exhaust port in real time. The sensor unit analyzes the acoustic signal generated by the gas flow in the exhaust port and evaluates whether noise is concentrated or resonance occurs in a specific frequency band. When the gas emitted from the exhaust port interacts with the structure and is amplified at a specific frequency, the control unit analyzes this and determines the optimal measure to suppress the resonance phenomenon.

The variable exhaust port control unit is configured to control the turbulence formation by adjusting the pressure and flow rate of the exhaust gas. The control unit may analyze whether the gas flow in the exhaust port affects noise generation based on the data acquired from the environmental detection sensor unit, and may induce the noise reduction effect by adjusting the exhaust port opening degree. The variable exhaust port control unit may be controlled mechanically or hydrodynamically and functions to limit noise emissions in a specific direction by adjusting the gas distribution inside the exhaust port.

The resonance damping flow control unit is a component that suppresses the resonance phenomenon by adjusting the flow path inside the exhaust port. When resonance is detected inside the exhaust port, the control unit activates the resonance damping flow control unit to change the gas flow and prevent noise concentration in a specific frequency band. The flow control unit may be implemented in a way that minimizes the resonance effect by changing the internal structure of the exhaust port or by using an additional flow distribution device.

The low-temperature liquid injection unit controls the temperature of the exhaust gas to induce the noise reduction effect. The control unit analyzes the effect of the temperature of the exhaust gas on noise generation, and when the temperature exceeds a certain temperature range, the control unit injects low-temperature liquid to change the density of the gas, thereby reducing noise. The low-temperature liquid is mixed with the gas inside the exhaust port and discharged, thereby changing the characteristics of the exhaust gas and controlling the turbulence and resonance effects.

The pattern analysis and learning module is configured to continuously analyze data based on machine learning and automatically apply the optimal noise reduction algorithm according to changes in environmental conditions. The module trains past data and automatically determines appropriate control measures when a similar environment occurs, and continuously improves noise reduction performance by reflecting new data in real time. The pattern analysis and learning module analyzes the state of exhaust gas, noise generation patterns, and environmental variables to derive the optimal noise reduction strategy under specific conditions.

The components according to the embodiment of the present disclosure can be applied individually or in combination, and are not limited to a specific method and can be modified in various ways. In addition, the individual components of the present disclosure can be adjusted in an optimal manner according to the characteristics of the exhaust gas and the noise reduction requirement, and can be implemented in various ways to more efficiently control the operation of the silencer body.

When the control unit according to one embodiment of the present disclosure receives the gas flow rate, pressure, temperature, and exhaust component data measured by the environmental detection sensor unit, the control unit identifies them and calculates a real-time change rate for each of them, and when it is identified that noise at the silencer exhaust port exceeds a preset first reference value, the control unit activates the variable exhaust port control unit to adjust an exhaust flow rate, adjusts an exhaust port opening degree so that a mixing method of the exhaust gas and an outside air changes, and uses the ultrasonic echo sensor unit to analyze whether acoustic resonance occurs in the exhaust port, operates the resonance damping flow control unit to change the flow path inside the exhaust port and adjust an air distribution structure so that noise is not concentrated in a specific frequency band when the resonance phenomenon is detected at a preset first frequency, operates the low-temperature liquid injection unit to inject low-temperature liquid inside the exhaust port and mix the low-temperature liquid with the exhaust gas to change the density and induce a noise reduction effect when the temperature of the exhausted gas exceeds a preset first temperature, continuously analyzes data collected throughout all the processes through a machine learning-based pattern analysis and learning module, trains past data to improve noise reduction performance according to changes in environmental conditions, and automatically applies an optimal noise reduction algorithm when a similar environment occurs.

The control unit according to one embodiment of the present disclosure receives the gas flow rate, pressure, temperature, and exhaust component data measured by the environmental detection sensor unit in real time, and calculates the change rate of each by analyzing the received data. The change in the gas flow rate is closely related to whether turbulence is formed in the exhaust port, and the change in the pressure affects the velocity and emission pattern of the exhaust gas. The change in the temperature determines the density and flow characteristics of the exhaust gas, and the exhaust component data acts as a major factor affecting noise generation. The control unit comprehensively analyzes these factors to predict the noise generation pattern and determines whether the noise generated from the exhaust port is likely to exceed the preset first reference value.

When it is identified that the noise exceeds the preset reference value, the control unit activates the variable exhaust port control unit to adjust the exhaust flow rate. The variable exhaust port control unit changes the flow of exhaust gas by adjusting the exhaust port opening degree, and controls the mixing method of exhaust gas and outside air. As the mixing method changes, the flow characteristics of the gas passing through the exhaust port change, which can induce a noise reduction effect in a specific frequency band.

The ultrasonic echo sensor unit analyzes in real time whether the gas emitted from the exhaust port forms a resonance at a specific frequency band. The noise may be amplified at a specific frequency due to interaction with structures surrounding the exhaust port, and when this phenomenon is detected, the control unit operates the resonance damping flow control unit to change the flow path inside the exhaust port. The change in the flow path is designed to prevent the exhaust gas from resonating at a specific frequency, and the phenomenon of noise being concentrated in a specific direction is suppressed by adjusting the air distribution structure.

When the temperature of the exhaust gas exceeds the preset first temperature, the control unit operates the low-temperature liquid injection unit to inject low-temperature liquid into the exhaust port. The low-temperature liquid is mixed with the exhaust gas, changing the gas density, which changes the characteristics of the noise generated from the exhaust port. When the density of the exhaust gas is adjusted within a specific temperature range, the noise reduction effect is maximized, and in the process, the turbulence formation pattern inside the exhaust port can be optimized.

The data collected in all the processes is continuously analyzed through the machine learning-based pattern analysis and learning module. The learning module trains noise reduction patterns according to environmental changes based on past data, and automatically applies the optimal noise reduction algorithm when a similar environment occurs based on the training. For example, when a tendency for noise of a certain frequency to be amplified under certain gas flow rate and pressure conditions is repeatedly observed, the control unit controls to predict the possibility of the condition recurring in advance and operates the variable exhaust port control unit and the resonance damping flow control unit in advance to prevent noise amplification.

In the embodiment of the present disclosure, the operation method of the control unit is designed to maintain the optimal noise reduction effect even under various environmental conditions, and the flow of exhaust gas can be optimized in real time by utilizing a combination of the variable exhaust port control unit, the resonance damping flow control unit, the low-temperature liquid injection unit, and the like. The control method of the present disclosure is not limited to a specific structure or method, and can be applied through various modifications.

The control unit according to one embodiment of the present disclosure controls the operation of the silencer body based on mathematical modeling, predicts noise intensity that occurs in the exhaust port using the gas flow rate, pressure, temperature, and exhaust component data collected from the environmental detection sensor unit, identifies a change in the noise intensity by reflecting structural characteristics of the silencer and gas flow characteristics, adjusts the exhaust port opening degree in real time to control the pressure and flow rate of the exhaust gas and analyzes a degree to which the gas forms turbulence in the exhaust port to determine a flow state capable of reducing noise when it is determined that the noise intensity in the exhaust port is likely to exceed a certain level, evaluates whether resonance is likely to occur at a specific frequency around the exhaust port based on the data measured by the ultrasonic echo sensor unit, and changes the flow path inside the exhaust port to prevent noise concentration in a specific frequency band when resonance is detected, calculates an appropriate amount of cooling for noise reduction by considering thermal characteristics and exhaust speed of the exhaust gas when the temperature of the exhaust gas exceeds a certain level, and supplies cooling fluid into the exhaust port by operating the low-temperature liquid injection unit to change the gas density and induce noise reduction effect, and analyzes the data collected in the mathematical modeling process in real time using the machine learning-based pattern analysis and learning module, and automatically adjusts the exhaust port opening degree, the flow path, or a cooling method to optimize noise reduction performance according to an environmental change by training past data.

The control unit according to one embodiment of the present disclosure controls the operation of the silencer body based on the mathematical modeling, predicts noise intensity that may occur in an exhaust port using gas flow rate, pressure, temperature, and exhaust component data collected from an environmental detection sensor unit, and identifies changes in noise intensity by reflecting structural characteristics and gas flow characteristics of the silencer. In the process of predicting the noise intensity, whether turbulence is formed according to changes in gas flow rate and pressure is analyzed, and whether noise in the exhaust port is likely to exceed a certain level is evaluated in real time.

When the noise intensity is expected to increase in the exhaust port, the exhaust port opening degree is adjusted in real time to control the pressure and flow rate of the exhaust gas, and the formation degree of turbulence of the gas inside the exhaust port is analyzed to determine the flow state that can reduce noise. The variable exhaust port control unit is configured to finely adjust the exhaust port opening degree, and controls the gas exhaust speed in real time to prevent the formation of a specific turbulent region. In the turbulence control process, the flow pattern of the gas generated inside the exhaust port is analyzed, and the exhaust port opening degree is optimized so that the noise is not amplified due to friction with the wall surface of the exhaust port.

Based on the data measured by the ultrasonic echo sensor unit, whether resonance is likely to occur at a specific frequency around the exhaust port is evaluated, and when the resonance is detected, the flow path inside the exhaust port is changed to prevent the noise concentration in a specific frequency band. The resonance damping flow control unit is designed to disperse a specific frequency range where resonance occurs by adjusting the variable flow path placed inside the exhaust port and reduce reflected waves generated around the exhaust port. In the resonance damping process, the air distribution structure is changed to suppress the phenomenon of noise concentration in a specific frequency band, and if necessary, an acoustic dispersion structure is formed inside the exhaust port to control so that the noise is not amplified in a specific direction.

When the temperature of the exhaust gas exceeds a certain level, the appropriate cooling amount for noise reduction is calculated by considering the thermal characteristics and exhaust speed of the exhaust gas, and the low-temperature liquid injection unit is operated to supply cooling fluid into the exhaust port to change the gas density and induce the noise reduction effect. During the cooling process, the optimal cooling method is determined by reflecting the temperature of the exhaust gas and the characteristics of the cooling fluid, and the noise reduction effect is adjusted according to the way the cooling fluid is mixed with the gas. For example, when a cooling fluid is injected to be uniformly distributed inside the exhaust port, the noise reduction effect is maximized as the temperature of the exhaust gas gradually decreases.

The data collected during the mathematical modeling process is analyzed in real time using a machine learning-based pattern analysis and learning module, and is implemented to automatically adjust the exhaust port opening degree, flow path, cooling method, or the like to optimize noise reduction performance according to environmental changes by training past data. The learning module builds the optimal noise reduction algorithm based on data collected under various environmental conditions, and provides the optimal noise reduction effect by adjusting the frequency of adjusting the opening degree of the exhaust port, the timing of changing the flow path, and the amount of cooling fluid injected in real time. Accordingly, the operation of the silencer body is designed to adaptively respond to environmental changes, and the operation is controlled to minimize noise generated from the exhaust port.

In one embodiment of the present disclosure, the control unit is implemented to analyze the noise intensity generated from the exhaust port in real time, identify noise amplification factors in advance and control. the noise amplification factors, and comprehensively evaluate the turbulence, resonance, and thermal changes occurring inside the exhaust port to perform the optimal noise reduction measures. The present disclosure is not limited to a specific method or structure and may be applied in various ways.

The control unit according to one embodiment of the present disclosure constructs the real-time prediction model based on the gas flow rate, pressure, temperature, and exhaust component data collected from the environmental detection sensor unit to predict changes in noise generated from the exhaust port in advance, and identifies conditions with a high possibility of noise increase in advance using the model. The environmental detection sensor unit measures the flow characteristics of gas through multiple sensors at specific points inside the exhaust port, and quantitatively evaluates the possibility of noise generation by comprehensively analyzing the rate of change in flow rate, pressure difference, temperature distribution, and changes in exhaust components. For example, when the flow rate inside the exhaust port changes rapidly or the pressure difference increases beyond a specific threshold, it is identified as a state with a high possibility of noise generation, and the control unit performs preemptive noise reduction measures based on this.

The velocity distribution and turbulence formation area of the fluid flow in the exhaust port are analyzed in real time, and the noise reduction effect is optimized by controlling the gas flow in three dimensions using the exhaust port opening degree and the multi-flow path control device inside the exhaust port. The variable exhaust port control unit finely adjusts the opening degree of the exhaust port to optimize the gas exhaust speed, and the multi-flow path control device placed inside the exhaust port controls the flow of the exhaust gas to prevent turbulence from forming in a specific area. The turbulence occurs when the gas collides with the wall surface or the flow rate difference is large inside the exhaust port, so the opening degree of the exhaust port is adjusted and the flow rate distribution is distributed evenly to maintain the fluid flow stably. The control unit analyzes whether turbulence is likely to be concentrated in a specific area of the exhaust port using a fluid analysis model, and when a specific pressure difference is exceeded, the variable exhaust port control unit and the multi-flow path control device are operated simultaneously to alleviate the turbulence.

The flow characteristics of the exhaust gas are automatically controlled by reflecting the external environmental factors including temperature and humidity inside the silencer and around the exhaust port, and the cooling injection pattern is changed to maximize the noise reduction effect under specific external climate conditions. Since the temperature and humidity affect the density and propagation speed of the exhaust gas, the control unit sets the reference value reflecting the average temperature and humidity by season, and when the external temperature measured in real time exceeds the reference value, the cooling fluid injection amount is adjusted to control the density of the gas. For example, when the external temperature is high, the temperature rise of the gas inside the exhaust port is likely to cause noise amplification, so the control unit operates the low-temperature liquid injection unit to quickly lower the temperature inside the exhaust port to prevent the noise amplification.

The gas distribution inside the exhaust port is modeled as a multi-layer, and the pressure difference at each noise generation location is analyzed to predict the pattern of noise increase in a specific frequency band in advance, and the gas mixing ratio inside the exhaust port is automatically adjusted based on the prediction to prevent resonance from forming. Depending on the speed and pressure difference of the gas inside the exhaust port, the acoustic resonance may occur at a specific point, which becomes the main cause of noise amplification. The control unit analyzes the acoustic signal inside the exhaust port using the ultrasonic echo sensor unit, and when the resonance is detected at a specific frequency, the variable exhaust port control unit and the resonance damping flow control unit are simultaneously activated to change the pressure distribution inside the exhaust port. This prevents the phenomenon of noise concentration in a specific frequency band and prevents resonance from forming by adjusting the gas discharge pattern.

In the process, the data collected in real time is analyzed using a machine learning-based adaptive control system, and the noise intensity that may occur in the exhaust port is predicted in advance, and the exhaust port opening degree, multi-flow path control device, and cooling fluid injection amount are preemptively adjusted to suppress the noise generation. The machine learning-based control system trains environmental data and noise patterns to automatically determine the optimal noise reduction measures under specific conditions. For example, when the exhaust port opening degree increases above a certain level, the noise pattern that occurred in the same environment in the past data is analyzed to predict the possibility of noise amplification, and the internal flow path of the exhaust port is changed in advance to suppress noise generation. In addition, the cooling fluid injection amount is also adjusted in real time, and the temperature change of the exhaust gas is trained so that the optimal cooling method can be automatically applied in a specific temperature range.

In the embodiment of the present disclosure, the control unit is designed to analyze the noise intensity generated from the exhaust port in real time, predict conditions that may increase noise in advance, and automatically adjust the exhaust port opening degree, fluid flow, cooling method, or the like to maximize the noise reduction performance. In addition, the above-described operations are not limited to a specific method and can be applied through various modifications, and the control algorithm can be adjusted to optimize the noise reduction effect in various environments.

The above-described embodiments are for illustrative purposes, and those skilled in the art will understand that the above-described embodiments can be easily modified into other specific forms without changing the technical idea or essential features of the above-described embodiments. Therefore, the above-described embodiments should be understood as illustrative in all respects and not restrictive. For example, each component described as a single type may be implemented in a distributed manner, and likewise, components described as distributed may be implemented in a combined form.

The scope of protection sought through this specification is indicated by the claims described below rather than the detailed description above, and should be interpreted to include all changes or modified forms derived from the meaning and scope of the claims and their equivalent concepts.

The invention claimed is:

1. A liquid oxygen vent silencer comprising:

a silencer body that receives cryogenic liquid gas and moves an internal space of the silencer body up and down to reduce noise; and a raising/lowering support portion that is installed along an outside of the silencer body and supports the silencer body by raising or lowering the silencer body from a ground, wherein the silencer body includes:

a first pipe having a first cylindrical shape having a first diameter;

a second pipe having a second cylindrical shape having a second diameter that is smaller than the first diameter; and a third pipe having a third cylindrical shape having a third diameter that is smaller than the first diameter and larger than the second diameter, wherein the first pipe has a first internal space that is a space between an outer peripheral surface of the third pipe and an inner peripheral surface of the first pipe, wherein the first internal space is sealed, wherein the third pipe is positioned in between the first pipe and the second pipe, wherein the third pipe has a third internal space that is a space between an outer peripheral surface of the second pipe and an inner peripheral surface of the third pipe, wherein the second pipe is positioned along an inner side of the third pipe, wherein the second pipe has a second internal space, wherein the second pipe has a lower end exposed to a lower side of the first pipe, wherein the lower end of the second pipe is configured to receive the cryogenic liquid gas and deliver the cryogenic liquid gas to the first internal space of the first pipe, wherein the third pipe is configured to: receive the cryogenic liquid gas which is raised along the second internal space of the second pipe and discharged into the third internal space of the third pipe through an upper side of the second pipe; and lower the cryogenic liquid gas along the third internal space, wherein the first pipe is configured to raise the lowered cryogenic liquid gas again through the first internal space of the first pipe and then discharge the cryogenic liquid gas to an outside through an upper side of the first pipe, and wherein the third pipe has a lower end that is disposed spaced upward from a bottom surface of the first internal space of the first pipe, wherein the third pipe has a second perforation portion having perforation holes repeatedly formed along a lower portion of the third pipe, wherein the second perforation portion is configured to discharge the cryogenic liquid gas lowered along the third internal space, wherein the third pipe has a third perforation portion having perforation holes repeatedly formed along an upper portion of the third pipe, wherein the third perforation portion is installed along an edge of an opening portion formed at an upper end of the first pipe and configured to discharge the cryogenic liquid gas raised again through the first internal space to the outside through the upper side of the first pipe, and wherein a lower end of the third perforation portion is sealed and configured to prevent the cryogenic liquid gas discharged to the upper side of the first pipe from flowing into the internal space of the silencer body.

2. The liquid oxygen vent silencer of claim 1, further comprising a copper soundproofing material installed in the third internal space of the third pipe.

3. The liquid oxygen vent silencer of claim 1, wherein the second pipe has a flange that is installed in the lower end of the second pipe, wherein an upper end of the second pipe is sealed by a pipe cap, wherein the second pipe has a first perforation portion having perforation holes repeatedly formed at an upper portion of the second pipe, and wherein the first perforation portion is configured to discharge the cryogenic liquid gas raised along the second internal space, from the flange.

4. The liquid oxygen vent silencer of claim 1, further comprising a buffer-type auxiliary support portion that is installed along an outer side of the first pipe to support the first pipe and absorb vibration or shock transferred from the first pipe during a noise reduction process, wherein the buffer-type auxiliary support portion includes a ring-shaped frame that is formed in a circular ring shape having a fourth diameter larger than the first diameter, and disposed to cover the outer side of the first pipe, a plurality of supports that is installed at first intervals along an outer side of the ring-shaped frame to support the ring-shaped frame, a plurality of movable buffer units that are installed at second intervals along an inner peripheral surface of the ring-shaped frame and disposed along an outer peripheral surface of the first pipe, support the outer peripheral surface of the first pipe while moving along the inner peripheral surface of the ring-shaped frame, absorb vibration or shock transferred from the first pipe, and a movable buffer unit that rotatably drives the movable buffer unit, the movable buffer unit includes a rotating ring that is formed in a circular ring shape corresponding to a shape of a sliding groove formed along the inner peripheral surface of the ring-shaped frame, installed along the inner side of the sliding groove and configured so that the plurality of movable buffer units are installed at the second intervals along the inner peripheral surface, and a ring rotation gear that is connected and interlocked with a gear tooth formed along an outer peripheral surface of the rotating ring and rotates in a forward or reverse direction to rotatably drive the rotating ring, and the movable buffer unit includes a rotational block that is installed on the inner peripheral surface of the rotating ring, a first support wheel that is installed so as to be rotatably connected to one side of a front end of the rotational block and exposed from the sliding groove and closely seated on the outer peripheral surface of the first pipe, and moves while rotating along the outer peripheral surface of the first pipe as the rotational block moves, and a second support wheel that is installed so as to be rotatably connected to the other side of the front end of the rotational block and exposed from the sliding groove and closely seated on the outer peripheral surface of the first pipe, and moves while rotating along the outer peripheral surface of the first pipe as the rotational block moves.

5. The liquid oxygen vent silencer of claim 4, further comprising a control unit that controls an operation of the silencer body, wherein the control unit includes an environmental detection sensor unit that measures a gas flow rate, pressure, temperature, and exhaust component inside the silencer body, an ultrasonic echo sensor unit that measures acoustic characteristics generated from an exhaust port of the silencer in real time, a variable exhaust port control unit that forms or alleviates turbulence by controlling a pressure and flow rate of an exhaust gas, a resonance damping flow control unit that controls a flow path inside the exhaust port to suppress a resonance phenomenon generated at the exhaust port, a low-temperature liquid injection unit that induces noise reduction by controlling the temperature of the exhaust gas, and a pattern analysis and learning module that analyzes a data pattern based on machine learning and automatically applies an optimal noise reduction algorithm, when the control unit receives the gas flow rate, pressure, temperature, and exhaust component data measured by the environmental detection sensor unit, the control unit identifies them and calculates a real-time change rate for each of them, and when it is identified that noise at the silencer exhaust port exceeds a preset first reference value, the control unit activates the variable exhaust port control unit to adjust an exhaust flow rate, adjusts an exhaust port opening degree so that a mixing method of the exhaust gas and an outside air changes, and uses the ultrasonic echo sensor unit to analyze whether acoustic resonance occurs in the exhaust port, operates the resonance damping flow control unit to change the flow path inside the exhaust port and adjust an air distribution structure so that noise is not concentrated in a specific frequency band when the resonance phenomenon is detected at a preset first frequency, operates the low-temperature liquid injection unit to inject low-temperature liquid inside the exhaust port and mix the low-temperature liquid with the exhaust gas to change gas density and induce a noise reduction effect when the temperature of the exhausted gas exceeds a preset first temperature, continuously analyzes data collected throughout all the processes through a machine learning-based pattern analysis and learning module, trains past data to improve noise reduction performance according to changes in environmental conditions, and automatically applies an optimal noise reduction algorithm when a similar environment occurs.

6. The liquid oxygen vent silencer of claim 5, wherein the control unit controls the operation of the silencer body based on mathematical modeling, predicts noise intensity that occurs in the exhaust port using the gas flow rate, pressure, temperature, and exhaust component data collected from the environmental detection sensor unit, identifies a change in the noise intensity by reflecting structural characteristics of the silencer and gas flow characteristics, adjusts the exhaust port opening degree in real time to control the pressure and flow rate of the exhaust gas and analyzes a degree to which the gas forms turbulence in the exhaust port to determine a flow state capable of reducing noise when it is determined that the noise intensity in the exhaust port exceeds a certain level, evaluates whether resonance occurs at a specific frequency around the exhaust port based on the data measured by the ultrasonic echo sensor unit, and changes the flow path inside the exhaust port to prevent noise concentration in a specific frequency band when resonance is detected, calculates an appropriate amount of cooling for noise reduction by considering thermal characteristics and exhaust speed of the exhaust gas when the temperature of the exhaust gas exceeds a certain level, and supplies cooling fluid into the exhaust port by operating the low-temperature liquid injection unit to change the gas density and induce noise reduction effect, and analyzes the data collected in the mathematical modeling in real time using the machine learning-based pattern analysis and learning module, and automatically adjusts the exhaust port opening degree, the flow path, or a cooling method to optimize noise reduction performance according to an environmental change by training past data.

7. The liquid oxygen vent silencer of claim 6, wherein the control unit constructs a real-time prediction model based on the gas flow rate, pressure, temperature, and exhaust component data collected from the environmental detection sensor unit to predict changes in the noise generated from the exhaust port in advance, and uses the model to identify a condition with a high possibility of noise increase in advance, analyzes a velocity distribution and turbulence formation area of the fluid flow in the exhaust port in real time, and optimizes the noise reduction effect by controlling the gas flow three-dimensionally by utilizing the exhaust port opening degree and a multi-flow path control device inside the exhaust port, automatically adjusts flow characteristics of the exhaust gas by reflecting an external environmental factor including temperature and humidity inside the silencer and around the exhaust port, and changes a cooling injection pattern to maximize the noise reduction effect under a specific external climate condition, models a gas distribution inside the exhaust port into multiple layers, analyzes a pressure difference by noise generation location to predict a pattern of noise increase in a specific frequency band, and automatically adjusts a gas mixing ratio inside the exhaust port based on the prediction to prevent resonance from forming, and analyzes data collected in real time in the process using a machine learning-based adaptive control system, predicts a noise intensity that occurs in the exhaust port in advance, and preemptively adjusts the exhaust port opening degree, the multi-flow path control device, and a cooling fluid injection amount to suppress noise generation.

* * * * *